United States Patent [19]

Haskell et al.

[11] Patent Number: 4,958,226
[45] Date of Patent: Sep. 18, 1990

[54] CONDITIONAL MOTION COMPENSATED INTERPOLATION OF DIGITAL MOTION VIDEO

[75] Inventors: Barin G. Haskell, Tinton Falls, N.J.; Atul Puri, Bronx, N.Y.

[73] Assignee: AT&T Bell Laboratories, Murray Hill, N.J.

[21] Appl. No.: 413,520

[22] Filed: Sep. 27, 1989

[51] Int. Cl.$^5$ ............................................. H04N 7/12
[52] U.S. Cl. ..................................... 358/136; 358/135
[58] Field of Search ........................ 358/135, 136, 133

[56] References Cited

U.S. PATENT DOCUMENTS

| | | | |
|---|---|---|---|
| 4,218,703 | 8/1980 | Netravali et al. | |
| 4,218,704 | 8/1980 | Netravali et al. | |
| 4,383,272 | 5/1983 | Netravali et al. | |
| 4,442,454 | 4/1984 | Powell | 358/167 |
| 4,460,923 | 7/1984 | Hirano et al. | 358/136 |
| 4,665,436 | 5/1987 | Osborne et al. | 358/135 X |
| 4,667,233 | 5/1987 | Furukawa | 358/136 |
| 4,727,422 | 2/1988 | Hinman | 358/135 X |
| 4,782,387 | 11/1988 | Sabri et al. | 358/135 |

OTHER PUBLICATIONS

"Movement-Compensated Frame-Frequency Conversion of Television Signals," H. Yamaguchi, T. Sugi and K. Kinuhata, IEEE Transactions on Communications, vol. COM-35, No. 10, Oct. 1987, pp. 1069-1082.

Primary Examiner—James J. Groody
Assistant Examiner—Victor R. Kostak
Attorney, Agent, or Firm—Henry T. Brendzel

[57] ABSTRACT

Motion digital video is encoded and decoded by a motion compensated interpolation method and apparatus. In accordance with the method, selected frames of the video are interpolated in the decoder with the aid of interpolation correction codes that are generated in the encoder and sent to the decoder. In an encoder embodiment that interpolates half of the frames, every other frame is encoded and decoded within the encoder. The decoded versions of adjacent frames are appropriately combined and compared to the interleaved camera frame that is to be interpolated in the decoder. The differences, which correspond to "pels correction" information, are encoded and quantized. Those that exceed a predetermined threshold value are added to the encoder's output buffer. The inverse operation is carried out in the decoder. That is every pair of decoded frames is averaged and combined with the decoded "pels correction" information to form the interpolated frames.

12 Claims, 2 Drawing Sheets

CONDITIONAL MOTION COMPENSATED INTERPOLATION OF DIGITAL MOTION VIDEO

BACKGROUND OF THE INVENTION

This invention relates to signal coding and, more particularly, to a method and apparatus for encoding and decoding video signals of moving images.

Video signals typically originate from video cameras. The bandwidth of video signals is quite substantial and consequently, practioners in the art have tried to reduce the bandwidth of these signals without unduly degrading the the images. Typically to reduce bandwidth the video signals are encoded and redundancies in the encoded signals are extracted and deleted. Different techniques are used in the art and some are better suited for still images, while others are better suited for moving images. One of the techniques for reducing the bandwidth of moving images is generally referred to as motion compensated predictive coding.

In conventional motion compensated predictive coding, each video frame is first partitioned into square blocks of picture elements (pels); such as blocks fo 8 pels by 8 pels. Each block is coded, in turn, and the developed encoded sequence is transmitted over a communications channel to a decoder. The communications channel may be, or may include, a storage element. Next, a determination is made as to whether or not the pels of the block have changed significantly compared with the previous frame. If not, an indicator signal is sent which signifies to the decoder that it needs to merely repeat the pels of that block from the previous frame obtain the pels for the current block. This is known as "Conditional Replenishment". If the pels have changed since the previous frame, an attempt is made to determine the best estimate of motion that is occurring in the block. This is frequently done by a "Block Matching Motion Estimation" technique wherein the pels of the current block are successively compared with various small shifts of the corresponding block in the previous frame. The shift that gives the best match is deemed to be the "best estimate" of the displacement in the block's image between frames, and the amount of this shift, called the "Motion Vector", is selected and sent to the decoder.

The pels of the current block are then compared with those of the "best" shifted block from the previous frame to see if there is a significant difference. If not, an indicator signal is sent to the decoder, which merely causes the pels of the shifted block from the previous frame to be repeated for the pels for the current shifted block. Such blocks are said to have been successfully "Motion Compensated". However, if there is a significant difference between the two blocks, the difference is encoded and sent to the decoder so that the pels of the current block may be more accurately recovered. Coding of this difference is typically performed by means of the "Discrete Cosine Transform" (DCT).

The volume of code that is generated by the above procedure is variable. It can be appreciated, for example, that image changes that do not correspond to a uniform translation, or motion, of the image may require substantial encoding to describe the deviation of a block from its best translated replica. On the other hand, when the image does not change between successive frames, then there is a minimal amount of information that needs to be encoded. To accommodate these potentially wide variations in the amount of code that needs to be transmitted, typical encoders include a FIFO memory at the output, to serve as a buffer.

The FIFO is not a panacea. For a given transmission rate, when an excessive volume data is generated, there is always a danger that the FIFO would overflow. When it does, coding must stop until the transmission channel can empty the FIFO sufficiently so that new data to be accepted into it. Since it is inconvenient to stop encoding in the middle of a frame, most systems discard an entire frame whenever the FIFO buffer is full, or nearly so. To compensate for the loss of a frame, such systems cause the decoder to repeat its most recently available frame. Frame repeating results in moving objects in the scene being reproduced in a jerky fashion, rather than in the smooth way that would occur if frame repeating were not invoked.

There have been some suggestions for improving the quality of the repeated frames in order to make them more faithfully resemble the original. One technique is called "Motion Compensated Interpolation". With this technique, instead of simply repeating the pels from the previous frame, the Motion Vectors are used to laterally displace the block by the appropriate amount prior to display. In other words, this method creates the missing block of pels by averaging over the immediately previous and following blocks of pels that are available to the decoder. While this might seem to be a good idea, experimental results show that when the images of successive blocks do not represent translational motion, the reproduced image may be worse than with frame repeating. Although it has been observed that this degradation is caused by a relatively few pels that do not conform to the assumption of translational motion, putting these pels in the wrong place creates highly visible artifacts.

SUMMARY OF THE INVENTION

In accordance with the principles of this invention, pels that cause highly visible artifacts are detected, and corresponding correction information is transmitted to the decoder. The amount of correction information that must be sent is relatively small, and the improvement in picture quality is quite large.

Since the interpolation technique that employs the principles of this invention yields good results, it has been found acceptable to interpolate every other frame, or two out of three frames, on a regular basis. The benefit of such regular interpolation is a reduced transmission bit rate which results from the fact that the pel correction information comprises fewer bits than the actual frame coding information.

In an encoder embodiment that interpolates half of the frames, every other frame is encoded and thereafter decoded within the encoder. The decoded versions of adjacent frames are appropriately combined and compared to the interleaved camera frame that is to be interpolated in the decoder. The differences, which correspond to "pels correction" information, are encoded and quantized. Those that exceed a predetermined threshold value are added to the encoder's output buffer. The inverse operation is carried out in the decoder. That is every pair of decoded frames is averaged and combined with the decoded "pels correction" information to form the interpolated frames.

DETAILED DESCRIPTION

Given a specified transmission rate in the communications channel, frame interpolation needs to be resorted to only when the FIFO is at, or near overflow. When that is the selected approach, the encoder of our invention encodes the blocks of every frame and concurrently develops the codes for interpolating the blocks from the information available to the encoder from previous and subsequent frames. At the input to the FIFO buffer, a switch is installed that is sensitive to the available memory in the buffer. When the available memory falls below a preselected threshold, the switch is set to accept the frame interpolation code. Otherwise, the switch is set to accept the frame encoding code. Other control techniques are also available, such as selecting some frames for encoding and some frames for interpolation, based on the occupancy level of the buffer. Both specific frames can thus be selected for interpolations as well as a proportion of frames to be interpolated.

The above insures that the encoder would not exceed the tranamission capacity of the communications channel. In some applications, however, it is more important to achieve a low transmission rate. Knowing that the frame interpolation code is less voluminous than the frame encoding code, it makes sense to accept the frame interpolation code wherever possible. The zeal to chose interpolation code in preference to the frame encoding code is tempered, however, by the level of degradation that is acceptable to the user in the reconstituted picture. It is further tempered by the observation that the volume of the frame interpolation code increase with increased use of the frame interpolation code so one could quickly reach a point of "diminishing returns" in the use of interpolation code.

Experimentally, it has been found that interpolating every other frame is quite beneficial. Accordingly, for the illustrative purposes of this disclosure, the following describes the structure and operation of an encoder and a decoder that interpolates every other frame in accordance with the principles of this invention.

Figure 1:
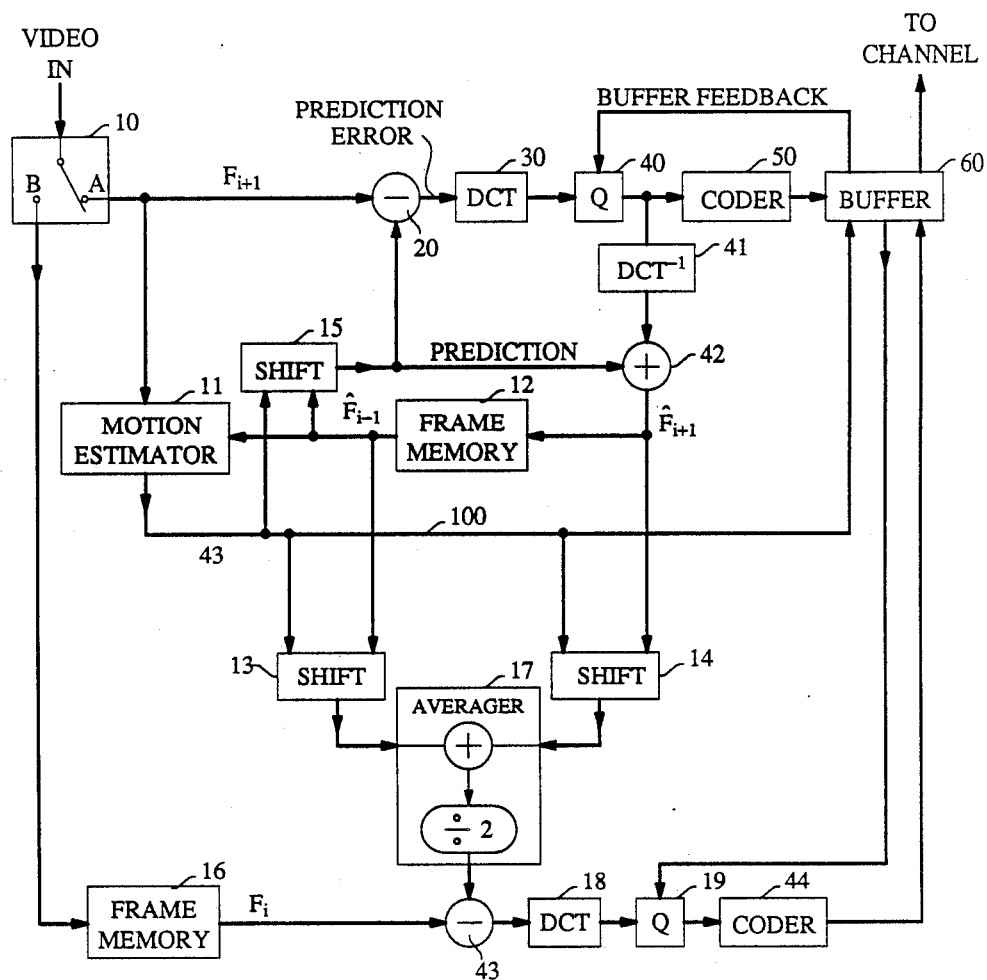
FIG. 1 presents a block diagram of an encoder in accordance with the principles of this invention.

FIG. 1 describes an encoder of our invention. In FIG. 1, a video signal is applied to switch 10. The switch toggles at the video frame rate and thus feed alternate frames to outputs A and B. The control is such that switch 10 is in position A when frame $F_{i+1}$ is coming out of the video camera. The index i designates the frame number from some arbitrary starting point. During the previous video frame period, frame $F_i$ came out of the camera, passed through output B of switch 10 and to the input of frame memory 16. Now, frame $F_i$ is coming out of frame memory 16. It is frame $F_i$ that will be interpolated in the decoder.

The following segment describes the operation of the motion compensation coding portion of the coder, which is well known to those skilled in the art.

Frame $F_{i+1}$ passes to subtractor 20 and to motion estimator 11. Frame memory 12 contains the frame that was previously coded via motion compensation; and in this case it is frame $F_{i-1}$. The output of memory 12 forms the other input to motion estimator 11. For each block of pels, motion estimator 11 compares the pels of frames $F_{i+1}$ and $F_{i-1}$ to determine the best estimate of motion. The best estimate is delivered as a motion vector signal on bus 100, and thus it passes to shift circuit 15. Circuit 15 also accepts the pels information about the previous frame, $F_{i-1}$, from frame memory 12, applies the appropriate translational shift according to the above-mentioned motion vector and outputs a block of "Prediction" pels to be used as a prediction of the incoming frame $F_{i+1}$ pels.

This prediction block of pels passes to the other input of substractor 20 whereupon it is subtracted from the incoming pels of frame $F_{i+1}$ to give a "Prediction Error" signal. The prediction error typically is transformed by DCT 30 and the output coefficients are quantized by quantizer 40. The quantized values are coded into bits coder 50 and passed to buffer 60 to await transmission to the decoder.

From the above, it is clear that the input to the quantizer depends on the nature of the moving image, and consequently and as indicated above, it has the possibility of emptying or overflowing. To avoid this, a feedback path is provided to quantizer 40, so that the quantizer coarseness can be increased if buffer overflow threatens, or decreased if buffer emptying is imminent.

Continuing with the description of motion compensated coding, the quantized output signals of quantizer 40 are inverse transformed by inverse DCT 41, and applied to adder 42. Adder 42 also receives the prediction pels of shift circuit 15 resulting in a coded version of frame $i+1$, $F_{i+1}$, which is passed into frame memory 12 for use with a subsequent frame as described above.

This completes the discussion of conventional motion compensation coding.

With the coded versions of frames $i-1$ and $i+1$, i.e., $F_{i-1}$ and $F_{i+1}$ being available, frame $F_i$ can be generated.

The $F_i$ generation starts with the motion vectors that are produced by motion estimator 11. These are used by shift circuit 13 to shift the incoming pels from frame $F_{i-1}$, perhaps by half the motion vector, to produce one estimate of the pels in frame $F_i$. Circuit 14 also uses the motion vectors of line 100 to shift the coded pels of $F_{i+1}$, perhaps by half and in the opposite direction from the motion vector. This produces another estimate of the pels of $F_i$.

The two estimates produced by shift circuits 13 and 14 are combined in averager 17 to produce the final prediction of frame $F_i$. This interpolated prediction is usually very good, but not always.

To improve the interpolated prediction in accordance with our invention, subtractor 43 calculates an error signal that corresponds to the difference between the actual frame data that exits frame memory 16 ($F_i$) and the predicted frame as it appears at the output of averager 17 ($\hat{F}_i$). The error signal is transformed by DCT 18, quantized by quantizer 19 and passed to coder 44, which detects large occurrences of interpolation error and codes them for transmission. The coded interpolation error is passed to buffer 60 in the same way as from coder 50. Similarly, a feedback path is provided to quantizer 19 to combat buffer overflow and underflow.

Figure 2:
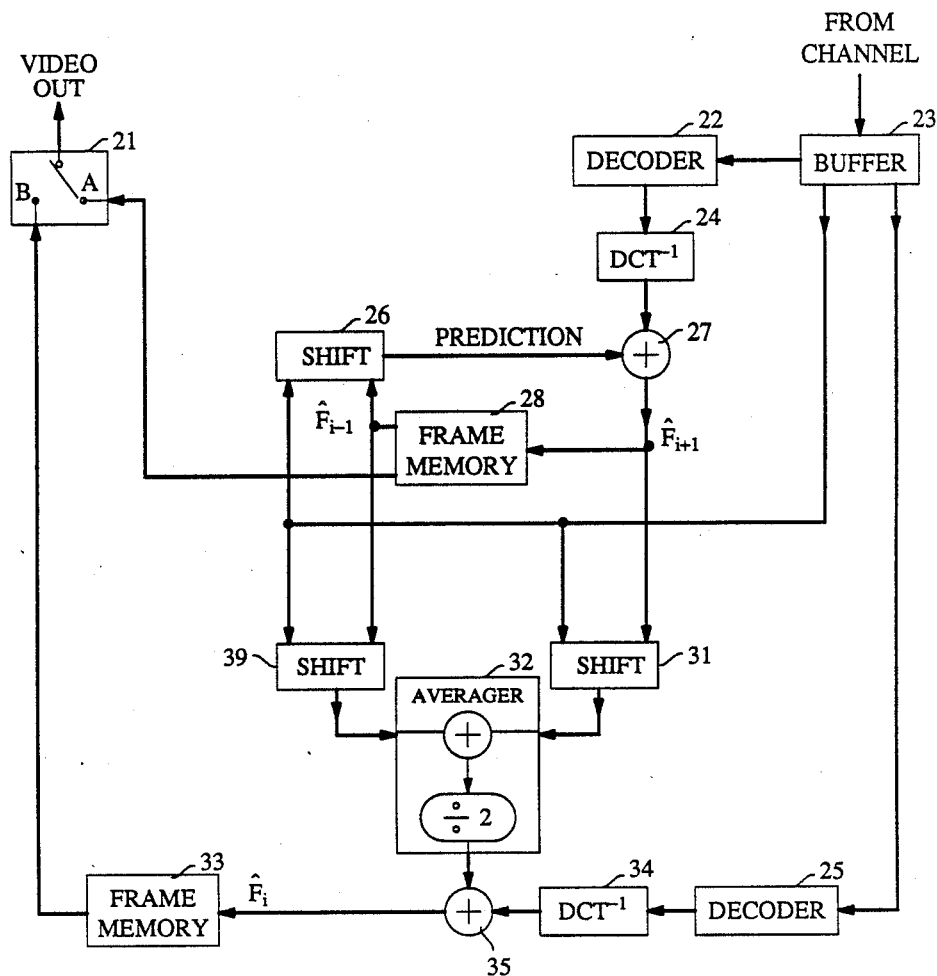
FIG. 2 depicts a block diagram of a decoder in accordance with the principles of this invention.

The decoder, depicted in FIG. 2, is very similar to the encoder. The components mirror corresponding components in the coder with a few deviations. In particular, the input is received in buffer 23 and is distributed therefrom based on the nautre of the signals. Frame encoding code (e.g. corresponding to $F_{i-1}$ and $F_{i+1}$) is sent to deocder 22 and therefrom to DCT$^{-1}$ 24, adder 27, memory 28 and shift circuit 26. These elements correspond to elements 41, 42, 12, and 15, respectively, and operate in the same manner. That is completely expected, since the function of these elements in the encoder is to emulate the decoder. Thus, the contents of memory 28 correspond to the estimated frames. Similarly, elements 39, 31 and 32 in the decoder correspond to elements 13, 14 and 17, respectively in the encoder and operate in the same manner.

The pels correction code also exits buffer 23, is decoded in decoder 25 and inverse transformed in element 34. This correction information is added to the estimate of $F_i$ developed by circuit 35 and is applied to memory 33. Memory 33 delays the $F_i$ information to permit a proper interleaving of $F_i$ between $F_{i-1}$ and $F_{i+1}$. As can be observed from above, one of the deviations is that the interpolation error subtractor 43 of the encoder becomes adder 35 at the deocder. Also, another output of frame memory 28 is shown since frame $F_{i-1}$ pels for the video output display may need to be read out at a different rate for the video output at switch 21 than the frame $F_{i-1}$ pels are needed for shift circuits 26 and 39.

It may be noted that there is a tradeoff between the buffer size of buffer 23 and the necessity for frame memory 33. If the buffer is sufficiently large, frame memory 33 could be deleted. The frame $F_i$ output from adder 35 would then pass directly to the video output via switch 21, which would be in position B. Following this, switch 21 would toggle to its A input, and decoding would stop for a frame period while frame $F_{i+1}$ was displayed via the output of frame memory 28 and the A input of switch 21. During this time, decoder buffer 23 would fill with data from the channel.

Many alternative arrangements are possible for the basic conditional motion compensation interpolation approach. For example, more than one frame might be conditionally interpolated, in which case shifter circuits 13, 14, 30 and 31 need to be more versatile and frame memories 16 and 33 need to be larger. Also in computing the best estimnate of motion, motion estimator 11 might take frame $F_i$ pels as additional input. This would enable simultaneous minimization of both motion compensation prediction error as well as interpolation error. Still other improvements may be introduced by skilled artisans practicing this invention without departing from the spirit and scope thereof.

We claim:

1. A circuit for encoding applied video signals that comprise successive frames, where each frame is divided into blocks, comprising:
    first means for encoding the blocks of some of said frames by developing for each block of such frames (a) and approximated version of said block derived from an approximated version of said block developed for a previous frame, and (b) a code which represents the deviation of said block from said approximated version of said block;
    second means for approximating the blocks of those of said frames that are to be interpolated by combining approximated versions of said blocks in selected ones of the frames that are encoded in said first means; and
    third means responsive to said second means and to said frames to be interpolated for developing a code that corresponds to those pels in blocks approximated by said second means that differ from corresponding pels in said frames to be interpolated by greater than a preselected threshold.

2. A circuit for encoding applied video signals that comprise successive frames, where each frame is divided into blocks, including means for encoding the blocks of some of said frames by developing for each block of such frames (a) an approximated version of said block derived from an approximated version of said block developed for a previous frame, and (b) a code which represents the deviation of said block from said approximated version of said block, the improvement comprising:
    second means for approximating the blocks of those of said frames that are to be interpolated by combining approximated versions of said blocks in selected ones of the frames that are encoded in said means for encoding; and
    third means responsive to said second means and to said frames to be interpolated for developing code that corresponds to those pels in blocks approximated by said second means that differ from corresponding pels in said frames to be interpolated by greater than a preselected threshold.

3. The circuit of claim 2 wherein said code developed for a pel by said third means represents the difference between the value of said pel and the value of said pel approximated by said second means.

4. The circuit of claim 2 wherein the frames selected for combining in said second means include a frame encoded in said first means that precedes the frame approximated in said second means and a frame encoded in said first means that succeeds the frame approximated in said means.

5. The circuit of claim 4 wherein said combining includes developing anticipated versions of said blocks.

6. The circuit of claim 2 wherein a set proportion of frames of said applied video signals are interpolated.

7. The circuit of claim 6 wherein said proportion is approximately one half.

8. The circuit of claim 2 fruther comprising buffer means for interposed between the codes developed by said means for encoding and said third means and an output port of said circuit.

9. The circuit of claim 8 for controlling the proportion of frames selected for interpolation by said second means and code generation by said third means based on the occupancy level of said buffer.

10. The circuit of claim 8 for selecting frames for interpolation by said second means and code generation by said third means when said buffer is occupied beyond a chosen proportion of its capacity.

11. The circuit of claim 7 wherein granularity of the codes generated by said first means and said third means is controlled by the occupancy level of said buffer.

12. A circuit responsive to coded video signals where the video signals comprise successive frames and each frame includes a plurality of blocks and where the coded video signals comprise codes that describe deviations from approximated blocks and codes that describe deviations from interpolated blocks, comprising:
    means for developing block approximations from said codes that describe deviations from approximated blocks; and
    means responsive to said block approximations and to said codes that describe deviations from interpolated blocks to develop said interpolated blocks.

* * * * *

US004958226C1

(12) EX PARTE REEXAMINATION CERTIFICATE (7034th)
United States Patent
Haskell et al.

(10) Number: US 4,958,226 C1
(45) Certificate Issued: Sep. 1, 2009

(54) CONDITIONAL MOTION COMPENSATED INTERPOLATION OF DIGITAL MOTION VIDEO

(75) Inventors: Barin G. Haskell, Tinton Falls, NJ (US); Atul Puri, Bronx, NY (US)

(73) Assignee: Multimedia Patent Trust, Wilmington, DE (US)

Reexamination Request:
No. 90/008,770, Jul. 16, 2007

Reexamination Certificate for:
Patent No.: 4,958,226
Issued: Sep. 18, 1990
Appl. No.: 07/413,520
Filed: Sep. 27, 1989

(51) Int. Cl.
*H04N 7/46* (2006.01)
*H04N 7/36* (2006.01)
*H04N 7/26* (2006.01)
*H04N 7/50* (2006.01)

(52) U.S. Cl. .............. 375/240.12; 375/E7.09; 375/E7.211; 375/E7.25; 375/E7.256

(58) Field of Classification Search .............. None
See application file for complete search history.

(56) References Cited

U.S. PATENT DOCUMENTS

| | | | |
|---|---|---|---|
| 3,736,373 A | 5/1973 | Pease ................... 375/240.12 |
| 4,202,011 A | 5/1980 | Koga ...................... 348/411.1 |
| 4,307,420 A | 12/1981 | Ninomiya et al. ...... 375/240.14 |
| 4,575,756 A | 3/1986 | Furukawa |
| 4,661,849 A | 4/1987 | Hinman ................. 375/240.16 |
| 4,675,733 A | 6/1987 | Tanimoto .............. 375/240.08 |
| 4,703,350 A | 10/1987 | Hinman |
| 4,754,492 A | 6/1988 | Malvar ...................... 382/268 |
| 4,794,455 A | 12/1988 | Ericsson ............... 375/240.14 |
| 4,816,914 A | 3/1989 | Ericsson ............... 375/240.03 |
| 4,821,119 A | 4/1989 | Gharavi ................ 375/240.16 |
| 4,833,535 A | 5/1989 | Ozeki et al. ............. 348/400.1 |
| 4,837,632 A | 6/1989 | Kubo et al. .............. 348/208.6 |
| 4,849,810 A | 7/1989 | Ericsson |
| 4,855,811 A | 8/1989 | Isnardi ................... 348/434.1 |
| 4,858,005 A | 8/1989 | Lodge |
| 4,890,160 A | 12/1989 | Thomas .................. 348/429.1 |
| 4,979,020 A | 12/1990 | Isnardi ................... 348/433.1 |
| 4,985,768 A | 1/1991 | Sugiyama .............. 375/240.16 |
| 5,113,255 A | 5/1992 | Nagata et al. ............ 348/416.1 |
| 5,161,001 A | 11/1992 | Pele et al. .............. 375/240.21 |

FOREIGN PATENT DOCUMENTS

| | | |
|---|---|---|
| EP | 0321318 | 6/1989 |
| JP | 53-082219 | 7/1978 |
| JP | 59-123383 | 7/1984 |
| JP | 59-196675 | 11/1984 |
| JP | 62-213493 | 9/1987 |
| JP | 62-213494 | 9/1987 |
| JP | 63-003586 | 1/1988 |

(Continued)

OTHER PUBLICATIONS

Ericsson, S., "Fixed and Adaptive Predictors for Hybrid Predictive/Transform Coding," IEEE Trans. on Communications, vol. COM–33, No. 12 (Dec. 1985).

(Continued)

*Primary Examiner*—Roland G Foster

(57) ABSTRACT

Motion digital video is encoded and decoded by a motion compensated interpolation method and apparatus. In accordance with the method, selected frames of the video are interpolated in the decoder with the aid of interpolation correction codes that are generated in the encoder and sent to the decoder. In an encoder embodiment that interpolates half of the frames, every other frame is encoded and decoded within the encoder. The decoded versions of adjacent frames are appropriately combined and compared to the interleaved camera frame that is to be interpolated in the decoder. The differences, which correspond to "pels correction" information, are encoded and quantized. Those that exceed a predetermined threshold value are added to the encoder's output buffer. The inverse operation is carried out in the decoder. That is every pair of decoded frames is averaged and combined with the decoded "pels correction" information to form the interpolated frames.

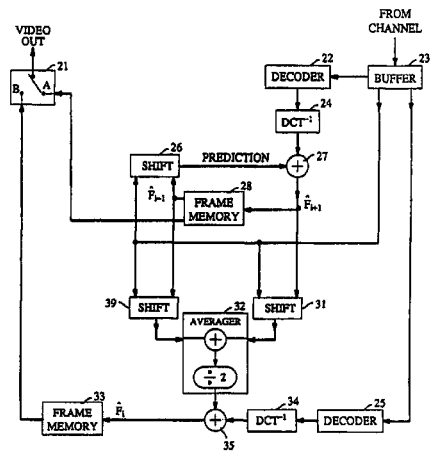

FOREIGN PATENT DOCUMENTS

| | | |
|---|---|---|
| JP | 64-065930 | 3/1989 |
| JP | 1-213086 | 8/1989 |
| JP | 2192378 | 7/1990 |
| JP | 2296479 | 12/1990 |
| JP | 3029477 | 2/1991 |
| JP | 3034691 | 2/1991 |

OTHER PUBLICATIONS

Haskell, B.G. et al., "Interframe Coding of 525–Line, Monochrome Television at 1.5 Mbit/s," IEEE Trans. On Comm., vol. COM–25, No. 11, pp. 1337–1348, Nov. 1977.

Haskell, B.G., "Frame Replenishment Coding of Television, Chapter 6, Image Transmission Techniques," Academic Press, 1979.

Jain, J.R., "Interframe Adaptive Data Compression Techniques for Images," Ph.D. Dissertation, State University of New York at Buffalo, Sep. 1979.

Kogure, T. (Matsushita), "ISO–IEC/JTC1/SC2/WG8–MPEG 89/189—Coded Representation of Picture and Audio Information—Proposal Package," Oct. 1989.

Le Gall, D. (Bellcore), ISO–IEC/JTC1/SC2/WG8–MPEG 89/182—"Coded Representation of Picture and AudioInformation," Oct. 1989.

Limb, J.O. et al., "Combining Intra–Frame and Frame–to–Frame Coding for Television," Bell Syst. Tech. J., vol. 53, No. 6, pp. 1137–1179, Aug. 1974.

Micke, T., "Vergleich eines prodiktiven und eines interpolativen bewegungskompensierenden Codierverfahrens fur Fernsehbildsignale" ("Comparison of a Predictive and an Interpolative Motion Compensating Coding Method for Television Video Signals"), Apr. 27, 1986.

Musmann, H.G. et al. "Advances in Picture Coding," Proceedings of the IEEE, vol. 73, No. 4, pp. 523–548 Apr. 1985.

Netravali, A.N. et al., "Picture Coding: A Review," Proceedings of the IEEE, vol. 68, pp. 366–406, Mar. 1980.

Okubo, "Reference Model Methodology—A Tool for the Collaborative Creation of Video Coding Standards," Proceedings Of The IEEE. vol. 83. No. 2, Feb. 1995.

Okubo, S. et al., "Candidates for Subsrate Coding Algorithm," H.261, Document #43, (Sep. 13, 1985).

Okubo, S. et al., "Generic Structure of 384×n kbit/s Codec," H.261, Document #60 (Jan. 13, 1985).

Okubo, S. et al., "Investigation of Basic Coding Algorithm for the Standard 384 kbit/s Codec," H.261, Document #22, (Apr. 1985).

Okubo, S., "A Proposal for Generic Structure of n×384 kbits/s Codec," H.261 Document #78, Mar. 1986.

Okubo, S., "Comments on Conditional Motion Compensated Frame Interpolation," H.261 Document #81, Mar. 1986.

Okubo, S., "Report of the Fifth Meeting in Tokyo," H.261 Document 103R, Mar. 25, 1986.

Pease, R.F.W., "Conditional Vertical Subsampling: A Technique to Assist in the Coding of Television Signals," Bell Syst. Tech. J., vol. 51, No. 4, pp. 787–802, Apr. 1972.

Philips, "ISO/IEC/JTC1/SC2/WG8 N MPEG 89/193—The Full Motion System" (1989).

Roos, P. et al., "Interframe vs. Intraframe Compression of Image Sequences," SPIE vol. 1137 pp. 145–149 (1989).

Sony, ISO/IEC/JTC1/SC2/WG2 MPEG 89/194 "Description of the Proposed Coding Algorithm," Oct. 2, 1989.

Tanimoto, M.et al., "A Hybrid Scheme of Subsampled DPCM and Interpolative DPCM for the HDTV Coding," Trans. of the IEICE, vol. E70, No. 7, pp. 611–613 (Jul. 1987).

Yashima, et al., "A Highly Efficient Coding Method for HDTV Signals," Proc. of the IEEE, vol. 1, pp. 125–129 (Jun. 1987).

Wada, M., "Frame Interpolation of Colour Video Signals with Movement Compensation," IEICE Technical Report, vol. 88, No. 138, pp. 39–46 (Jul. 22, 1988) (with partial unofficial translation).

Kamikura et al. "A Study on Moving Picture Coding Scheme for Digital Storage Media", TEJ Technical Report, vol. 13, No. 25, pp. 13–18, ICS's 89–11 (May 1989). (with English translation).

N.K. Lodge, "A Hybrid Interpolative and Predictive Code for the Embedded Transmission of Broadcast Quality Television Pictures," Second International Conference on Image Processing and Its Applications, vol. 265, Jun. 24–26, 1986.

Arun N. Netravali & Barry G. Haskell, Digital Pictures: Representation and Compression (1988).

EX PARTE
REEXAMINATION CERTIFICATE
ISSUED UNDER 35 U.S.C. 307

NO AMENDMENTS HAVE BEEN MADE TO
THE PATENT

AS A RESULT OF REEXAMINATION, IT HAS BEEN DETERMINED THAT:

The patentability of claim 12 is confirmed.

Claims 1–11 were not reexamined.

* * * * *